United States Patent

[11] 3,614,424

| [72] | Inventor | Ian K. Openshaw<br>Bishops Stortford, England |
|---|---|---|
| [21] | Appl. No. | 886,660 |
| [22] | Filed | Dec. 19, 1969 |
| [45] | Patented | Oct. 19, 1971 |
| [73] | Assignee | Associated Electrical Industries Limited<br>London, England |
| [32] | Priority | Mar. 28, 1966 |
| [33] | | Great Britain |
| [31] | | 13584/66 |
| | | Continuation-in-part of application Ser. No.<br>625,718, Mar. 24, 1967, now abandoned. |

[54] COLLIMATOR FOR AN X-RAY ANALYZER
1 Claim, 3 Drawing Figs.

[52] U.S. Cl. .................................................. 250/49.5PE,
250/51.5, 250/105
[51] Int. Cl. ..................................................... H01j 37/00,
H01j 35/16
[50] Field of Search ............................................. 250/49.5
PE, 51.5, 83.3 D, 105

[56] References Cited
UNITED STATES PATENTS

| 1,909,118 | 5/1933 | Raab ............................ | 250/105 |
| 2,847,581 | 8/1958 | Clark............................ | 250/105 X |
| 2,958,776 | 11/1960 | Jones et al. .................... | 250/51.5 X |
| 3,056,027 | 9/1962 | Martinelli...................... | 250/83.3 X |
| 3,471,694 | 10/1969 | Poen ............................ | 250/49.5 |

FOREIGN PATENTS

| 960,373 | 6/1964 | Great Britain................ | 250/83.3 |

Primary Examiner—William F. Lindquist
Attorney—Watts, Hoffmann, Fisher and Heinke ABSTRACT: An X-ray analyzer including a collimator having an array of screens with aligned slits and means for producing a magnetic field so that any electrons in a radiation beam passing through the slits are deflected and trapped by the screens without affecting the X-ray beam.

INVENTOR.
IAN K. OPENSHAW

COLLIMATOR FOR AN X-RAY ANALYZER

CROSS-REFERENCES TO RELATED APPLICATION AND PATENT

This is a continuation-in-part of application Ser. No. 625,718, filed Mar. 24, 1967, by Ian Kay Openshaw entitled "Collimators for X-ray Apparatus," now abandoned.

2. U.S. Pat. No. 2,958,776, issued Nov. 1, 1960 to T. C. Jones et al., under the title "Mechanical Linkages."

BACKGROUND OF THE INVENTION

This invention relates X-ray analyzers and more specifically to collimators in that class of X-ray analyzers in which an electron beam is used to bombard a specimen to cause it to emit characteristic X-radiation.

When a solid sample is bombarded with electrons it will emit X-rays. The emitted X-rays are of wavelengths characteristic of the elements present in the sample. If these emitted X-rays are deflected by a diffracting crystal, the angle of deflection will depend upon the wavelength and hence upon the nature of the material emitting the X-rays.

An example of an X-ray analyzer is disclosed in the referenced U.S. patent. That device is used to analyze material by bombarding a sample with a beam of electrons. This bombardment causes the sample to emit X-rays which are projected onto a diffraction crystal. A detector is moved angularly to measure the angles of diffraction of the X-rays and thus identify the elements present.

In order that such a measurement shall be fully accurate, it is necessary to ensure that only the beam of X-ray radiation reflected by the crystal reaches the detector. All stray radiation and stray electrons should be excluded to avoid spurious readings.

SUMMARY OF THE INVENTION

The X-ray analyzer of the present invention uses a novel eliminator for X-rays and like radiation. The collimator has an array of spaced parallel screens. The screens have aligned slit apertures which are preferably of progressively varying width. A plurality of magnets are provided. The magnets are positioned between the screens and on opposite sides of the beam path. These magnets produce a magnetic field across the beam path to deflect electrons laterally so that the electrons are intercepted by the screens.

The slit apertures, for example, extend vertically over part of the height of the screens and the magnetic field be arranged to deflect the electrons vertically so that they impinge on the screens or other parts of the collimator.

Accordingly, the principal object of the invention is to provide an X-ray analyzer equipped with a novel and improved collimator.

Other objects and and a fuller understanding of the invention may be had by referring to the following description and claims taken in conjunction with the accompanying drawings.

Figure 1:
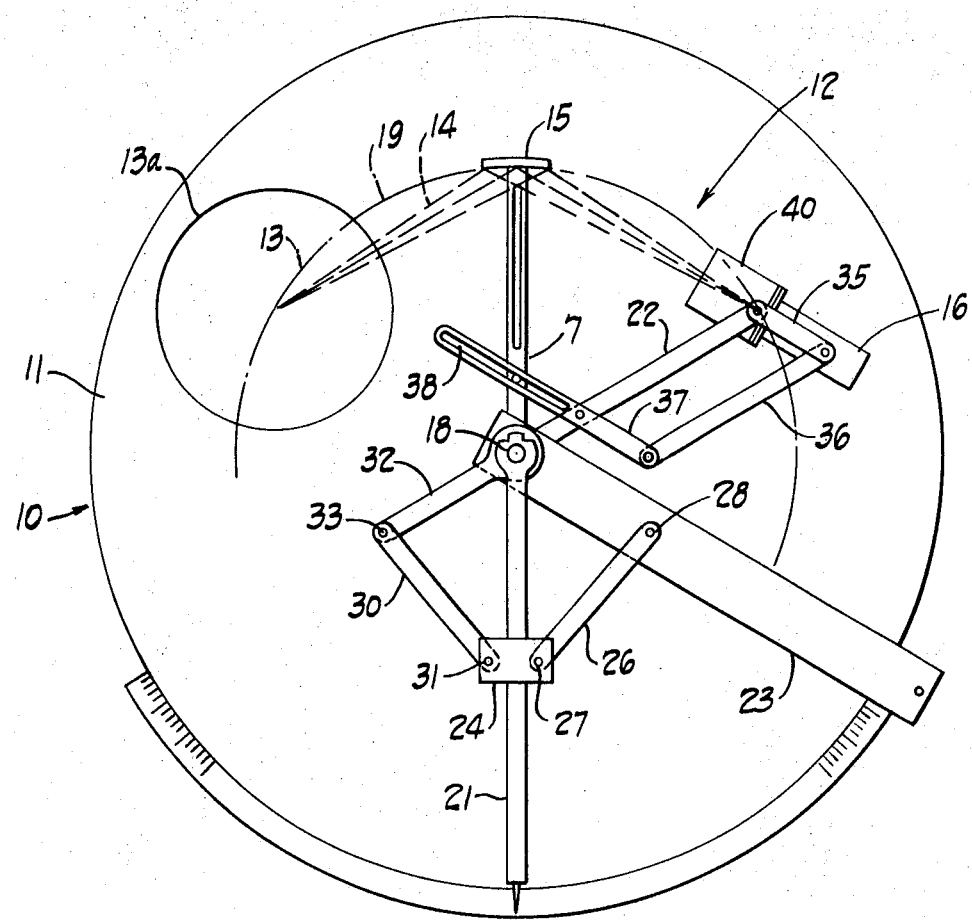
FIG. 1 is a schematic view of an X-ray analyzer equipped with a novel collimator.

Referring now to the drawings and to FIG. 1 in particular, an X-ray analyzer is shown generally at 10. The analyzer 10 includes a support surface 11. A mechanical linkage shown generally at 12 is mounted on the support surface 11.

An electron beam source, not shown, is mounted within the analyzer 10. The electron beam source is positioned such that a beam of electrons emitted by it strikes a specimen mounted on the support surface 11 at a specimen position 13. The specimen is within a specimen chamber indicated schematically at 13a.

When the specimen is bombarded by the electron beam, it emits X-rays which are characteristic of properties of the specimen. An X-ray crystal 15 is mounted in the path of certain of these emitted X-rays to diffract the X-rays into an X-ray detector 16. The X-rays which are diffracted are indicated schematically at 14.

The disclosed linkage 12 is described in greater detail in the referenced U.S. Pat. No. 2,958,776. Briefly, it includes a support arm 17, mounted on a pivotal shaft 18. The support arm 17 carries the crystal 15. As the support arm 17 is rotated about the axis of the pivotal shaft 18, it moves the crystal in an arc indicated by dashed arc line 19. The specimen position 13 and the entrance to the detector 16 are also along the same arc indicated by the dashed arc line 19.

A drive arm 21 is also carried by the pivotal shaft 18. The drive arm 21 is fixed to and aligned with the support arm 17 so that it constitutes an extension of that arm. A detector arm 22 is also provided. The detector arm 22 is pivotal about the axis of pivotal shaft 8. The detector arm 22 carries the detector 16.

A slide 24 is slidably mounted on the drive arm 21. The slide 24 is connected to a fixed arm 25 by a slide control link 26. This slide control link 26 is pivotally connected to the slide and the fixed arm at pivots 27, 28 respectively. A detector control link 30 is pivotally connected to the slide at 31. The detector control link 30 is also pivotally connected to a detector control arm extension 32 by a pivot 33. The detector control arm extension is aligned with and fixed to the detector arm 22 so that the two move together.

A detector angle control linkage is provided. This angle control linkage is comprised of the detector arm 22 and three detector links 35, 36, 37. The detector arm and the links 35, 36, 37 are pivotally connected in a parallelogram.

The link 37 has a slotted portion 38 extending beyond the parallelogram.

A guide pin 40 is carried by the support arm 17. The guide pin 40 extends into the slotted portion to engage it and control its position.

As the support arm 17 and the drive arm 21 are moved in unison about the axis of the pivotal shaft 18, the action of the link 26 causes the slide 24 to move along the drive arm 21. The action of the moving slide and the detector control link 30 causes the detector 16 to be moved at an appropriate rate to maintain it in position to receive X-rays diffracted by the crystal 15. The parallelogram linkage, as controlled by the guide pin 40, serves to maintain the detector oriented toward the crystal and therefore oriented to receive rays diffracted by it.

A collimator 40 is provided. The collimator 40 is fixed to and carried by the detector 16. The collimator is shown in greater detail and on an enlarged scale FIGS. 2 and 3.

The collimator has five spaced X-ray impervious screens S1–S5, inclusive. These screens S1–S5 are arranged parallel to one another and respectively provided with apertures or slits A1–A5 inclusive.

Figure 2:
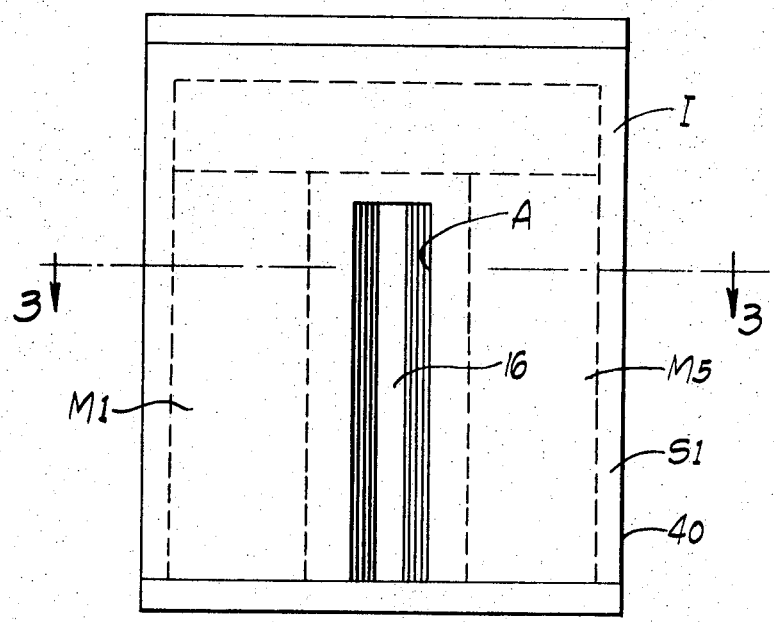
FIG. 2 is an entrance and elevation of the novel collimator of the invention.
Figure 3:
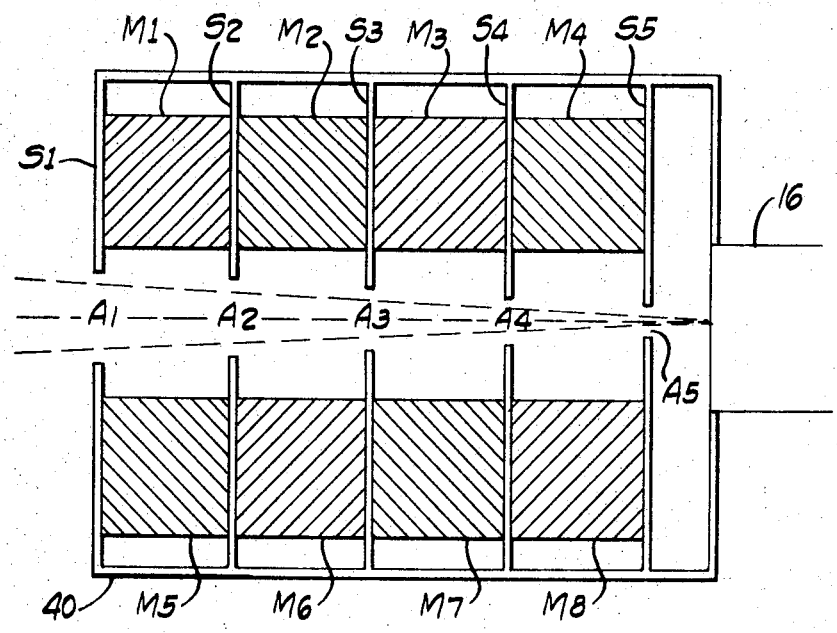
FIG. 3 is a horizontal section taken along lines 2—2 of FIG. 2.

As can be seen from FIG. 2 which is an elevational view from the entrance end of the collimator 40, the screens S1–S5 are of uniform height. As can be seen from both FIGS. 2 and 3, apertures A1–A5 are of progressively diminishing width from left to right as viewed in FIG. 3. In other words, the width of the apertures diminishes in the direction of beam travel toward the detector 16.

A plurality of magnets M1–M8 inclusive are provided. The magnets M1–M4 form a set which are positioned to one side of the X-ray beam while the magnets M5–M8 form another set which are positioned on the opposite side of the beam. The magnets M1–M4 are of one polarity, and the magnets M5–M8 are of an opposite polarity so that a horizontal, magnetic flux is established across the beam path.

Each of the magnets is positioned between an adjacent pair of screens. Thus the magnets M1 and M5 are between the screens S1, S2; the magnets M2 and M6 between the screens S2 and S3 and so on.

The produced magnetic flux or field is such that any stray electrons entering the collimator along with the X-ray beam are deflected either upwardly or downwardly. They are thence intercepted by the portions of the screens lying above or below the apertures A1–A5, as the case may be. Clearly, if electrons are defected through a large angle, they may impinge on parts other than the screens such as the magnet system.

In the arrangement shown in the drawings, the apertures A1–A5 extend vertically upward from the base, but are spaced from the top of the collimator 40. With the disclosed arrangement the polarity of the magnets is such that electrons are deflected upwardly. Clearly, they could extend downwardly from the top of the collimator and be spaced from the base or bottom of the collimator. In the latter instance, the flux would be reversed so that electrons would be deflected downwardly rather than upwardly as would normally be the case with the disclosed embodiment.

Although the collimator is shown located in front of the detector in an X-ray analyzer, it could also be used in other positions in the X-ray path. For example, it could be positioned between the specimen chamber and the crystal. In the latter case, the collimator would be reversed to give a divergent beam. Other convenient positions would be at the specimen chamber outlet and at the input in the reflecting crystal.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In an analytical instrument of the type in which a specimen is bombarded by a beam of electrons to cause it to emit characteristic X-rays which are analyzed by a detector, the improvement of a collimator comprising:

an array of parallel X-ray and electron opaque screens, said screens being spaced from one another and having edges defining slit apertures and delineating an open, unobstructed and defined X-ray path;

said apertures being aligned along a path of the X-ray beam;

a plurality of sets of magnets on opposite sides of said path for producing a magnetic field laterally of the X-ray beam path to deflect electrons in the beam so that the deflected electrons are trapped by the collimator, the magnets of each set being spaced along and spaced from said X-ray path;

said sets of magnets being interleaved with said screens such that said magnets are operative within substantially the same region as said screens; and said collimator being positioned adjacent a selected one of the specimen and the detector.